United States Patent
Tao

(10) Patent No.: US 11,438,298 B2
(45) Date of Patent: Sep. 6, 2022

(54) METHOD AND APPARATUS FOR FORWARDING CONTENT BETWEEN DIFFERENT APPLICATION PROGRAMS

(71) Applicant: HUAWEI TECHNOLOGIES CO., LTD., Guangdong (CN)

(72) Inventor: Zhidong Tao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 15/769,043

(22) PCT Filed: Jun. 12, 2016

(86) PCT No.: PCT/CN2016/085478
§ 371 (c)(1),
(2) Date: Apr. 17, 2018

(87) PCT Pub. No.: WO2017/214773
PCT Pub. Date: Dec. 21, 2017

(65) Prior Publication Data
US 2020/0244616 A1    Jul. 30, 2020

(51) Int. Cl.
*H04L 51/56* (2022.01)
*G06F 16/2455* (2019.01)
(Continued)

(52) U.S. Cl.
CPC ........ *H04L 51/56* (2022.05); *G06F 16/24558* (2019.01); *H04L 51/046* (2013.01);
(Continued)

(58) Field of Classification Search
CPC ......... H04L 51/32; H04L 51/18; H04L 67/02; H04L 51/04; H04L 61/1594;
(Continued)

(56) References Cited

U.S. PATENT DOCUMENTS 8,612,525 B2 * 12/2013 Hardy ............... H04L 29/12103
709/206
2006/0288298 A1    12/2006 Haitani et al.
(Continued)

FOREIGN PATENT DOCUMENTS

CN        101079785 A    11/2007
CN        101459628 A     6/2009
(Continued)

OTHER PUBLICATIONS

Extended European Search Report issued in European Application No. 16904892.3 dated Aug. 14, 2018, 10 pages.
(Continued)

*Primary Examiner* — Hitesh Patel
(74) *Attorney, Agent, or Firm* — Fish & Richardson P.C.

(57) ABSTRACT

Example methods and apparatuses for forwarding content between different application programs are disclosed. In one example method, a first address book of a first application program is associated with a second address book of a second application program. When a content forwarding instruction is received, the second address book is invoked and displayed, where the content forwarding instruction is used to forward selected content in the first application program to the second application program. A contact selected by a user is determined, and the selected content is forwarded to the determined contact.

16 Claims, 10 Drawing Sheets

(51) Int. Cl.
  *H04L 51/046* (2022.01)
  *H04W 4/14* (2009.01)
  *H04L 51/48* (2022.01)
  *H04L 51/214* (2022.01)

(52) U.S. Cl.
  CPC ............ *H04L 51/214* (2022.05); *H04L 51/48* (2022.05); *H04W 4/14* (2013.01)

(58) Field of Classification Search
  CPC ....... H04L 51/046; H04L 51/10; H04L 51/36; H04L 67/10; H04M 1/7243; H04W 4/14; G06F 16/00
  See application file for complete search history.

(56) References Cited

U.S. PATENT DOCUMENTS

| | | | |
|---|---|---|---|
| 2007/0087766 A1* | 4/2007 | Hardy | H04M 1/72583 455/466 |
| 2008/0288597 A1* | 11/2008 | Christensen | H04L 63/062 709/206 |
| 2009/0213826 A1 | 8/2009 | Wang et al. | |
| 2010/0069095 A1 | 3/2010 | Yahav et al. | |
| 2012/0157135 A1 | 6/2012 | Olague et al. | |
| 2013/0055378 A1* | 2/2013 | Chang | G06F 21/53 726/17 |
| 2014/0095638 A1 | 4/2014 | Chen | |
| 2014/0099930 A1 | 4/2014 | Yu et al. | |
| 2014/0201279 A1* | 7/2014 | Turakhia | G06Q 10/10 709/204 |
| 2014/0358695 A1 | 12/2014 | Setton et al. | |
| 2015/0208215 A1 | 7/2015 | Arnold et al. | |
| 2015/0215261 A1* | 7/2015 | Zhang | H04L 51/16 709/206 |
| 2015/0339482 A1* | 11/2015 | Wurster | G06F 21/629 726/30 |
| 2015/0373092 A1* | 12/2015 | Ranganath | G06F 3/0482 709/201 |
| 2020/0092231 A1* | 3/2020 | Yu | H04L 51/02 |
| 2020/0125218 A1* | 4/2020 | Bender | H04L 51/04 |

FOREIGN PATENT DOCUMENTS

| | | |
|---|---|---|
| CN | 101720009 A | 6/2010 |
| CN | 101730009 A | 6/2010 |
| CN | 102395112 A | 3/2012 |
| CN | 102469144 A | 5/2012 |
| CN | 102694742 A | 9/2012 |
| CN | 102932414 A | 2/2013 |
| CN | 103067427 A | 4/2013 |
| CN | 103095549 A | 5/2013 |
| CN | 103136042 A | 6/2013 |
| CN | 103618824 A | 3/2014 |
| CN | 104168545 A | 11/2014 |
| CN | 104954977 A | 9/2015 |
| CN | 105242838 A | 1/2016 |
| CN | 105490912 A | 4/2016 |
| CN | 105872254 A | 8/2016 |
| EP | 2224653 A1 | 9/2010 |
| EP | 2239920 A1 | 10/2010 |
| JP | 2010539749 A | 12/2010 |
| JP | 2012503363 A | 2/2012 |
| WO | 2013174315 A1 | 11/2013 |

OTHER PUBLICATIONS

Office Action issued in Chinese Application No. 201680016621.6 dated Apr. 28, 2020, 8 pages.
Office Action issued in Japanese Application No. 2018-519341 dated Feb. 25, 2020, 7 pages (with English translation).
Office Action issued in Chinese Application No. 201680016621.6 dated Aug. 5, 2019, 8 pages.
International Search Report issued in International Application No. PCT/CN2016/085478 dated Feb. 27, 2017, 14 pages.
Office Action issued in Japanese Application No. 2018-519341 dated Jun. 25, 2019, 6 pages (with English translation).
Office Action issued in Chinese Application No. 202110756837.9 dated Feb. 7, 2022, 13 pages (with English translation).

* cited by examiner

METHOD AND APPARATUS FOR FORWARDING CONTENT BETWEEN DIFFERENT APPLICATION PROGRAMS

CROSS-REFERENCE TO RELATED APPLICATIONS

This application is a National Stage of International Application No. PCT/CN2016/085478, filed on Jun. 12, 2016, which is hereby incorporated by reference in its entirety.

TECHNICAL FIELD

The present invention relates to the mobile communications field, and specifically, to a method and an apparatus for forwarding content between different application programs.

BACKGROUND

As a traditional non-instant messaging tool, a short message service has entered people's daily life. However, the short message service has disadvantages such as relatively poor real-time performance, a limited variety of content that can be transmitted, a limited capacity in a single transmission, and relatively high costs. As smartphones become popular, a coverage area of a wireless data service expands, and traffic prices are reduced, market shares of the short message service are gradually occupied by instant messaging tools (for example, WeChat). However, instant chat tools cannot completely replace the short message service in a quite long time due to signal coverage and other reasons, and the two kinds of communication services will coexist for a long time.

A user has a requirement for forwarding content in a process of using a messaging tool. It is convenient to forward content inside a same application program, while it is difficult to forward content between different application programs. A most primitive method is to copy content to be forwarded, open another application program, find a target object, paste the content, and then send the content. This method requires whole-process manual operations and cumbersome steps, and cannot meet a fast forwarding requirement of the user.

In the prior art, a forwarding operation may be performed by using a server of a service provider. During forwarding from a current application program (for example, WeChat) to a target application program (for example, a short message service), content to be forwarded is selected, and then, the content is sent to the server (for example, a WeChat server) of the service provider. The server forwards the content to an associated account (for example, a WeChat account or a mobile phone number) of a forwarded-to object. The target application program receives and displays the forwarded content. To create the associated account, the forwarded-to object needs to register a service account with the server and bind an associated target address, for example, a mobile phone number. The prior art has the following disadvantages: The forwarded-to object needs to register an associated account with the server. The overall solution cannot be implemented without participation of the service provider/server that provides a related service, and a system is quite complex. The provider that provides the related service may demand charges for a service after the service is available free of charge for a period of time, or may require a user to provide some private information.

In another prior art, forwarding may be implemented by using a third-party application program installed in a mobile phone. The application program is capable of parsing and encapsulating content of another messaging service. During forwarding from a current application program (for example, WeChat) to a target application program (for example, a short message service), content to be forwarded is selected, and then, the third-party application program is started. The third-party application program can parse the content, and encapsulate the content according to a forwarded-to object selected by a user. Then the target application program receives and displays the content. The prior art has the following disadvantages: Parsing and encapsulating the forwarded content may be subject to technical limitations. If the content is encrypted or compressed, assistance of a messaging application program provider is needed. A lot of steps need to be performed to install the third-party application program, decreasing usability. A source of the third-party application program is unreliable, and an information security issue may be caused, especially when the content includes privacy or confidential information.

It can be learnt that when content is forwarded between different application programs, implementation of the prior-art solutions is complex and requires a lot of steps and participation of a server provider or a third-party application program. A technical obstacle or a data disclosure risk may exist. All these factors affect promotion and application of the solutions.

SUMMARY

In view of this, embodiments of the present invention provide a method and an apparatus for forwarding content between different application programs, so as to improve convenience of forwarding content between different application programs and avoid a technical obstacle and a disclosure risk.

According to a first aspect, an embodiment of the present invention provides a method for forwarding content between different application programs, where the method includes:

associating a first address book of a first application program with a second address book of a second application program;

when a content forwarding instruction is received, invoking and displaying the second address book, where the content forwarding instruction is used to forward selected content in the first application program to the second application program;

determining a contact selected by a user; and forwarding the selected content to the determined contact.

With reference to the first aspect, in a first implementation of the first aspect, when the first address book of the first application program is associated with the second address book of the second application program, the first application program obtains permission to read and copy the second address book of the second application program, and the second application program obtains permission to read and copy the first address book of the first application program. When content is forwarded between a short message service and an instant messaging tool, the instant messaging tool obtains, from an operating system, corresponding control permission, for example, permission to read and copy a local address book of a mobile terminal system. To obtain permission, during installation or usage of the instant messaging tool, the instant messaging tool may apply to the operating system for the related permission, or ask for user consent for obtaining the related permission. A method for forwarding content between the short message service and the instant messaging tool can be used only when allowed by the system or the user. After the permission is obtained, the first address book may be associated with the second address book.

With reference to the first aspect or the first implementation of the first aspect, in a second implementation of the first aspect, during association, the two messaging application programs import or copy the address books from the peer, or a common address book is generated by means of combination. For example, the first application program imports or copies the address book of the second application program to the first application program, and the second application program imports or copies the address book of the first application program to the second application program. The generated common address book can be invoked by the first application program and the second application program.

With reference to the second implementation of the first aspect, in a third implementation of the first aspect, the generating a common address book by means of combination includes: adding up contact lists of the address books of the two application programs, performing matching according to a matching condition, an index item, or a keyword, and combining successfully-matched contacts. The finally-formed common address book may include only a list of successfully-matched contacts, or may include a list of successfully-matched contacts and a list of unsuccessfully-matched contacts. Further, the common address book may be stored in a mobile terminal locally or in the two application programs. After the successfully-matched contacts are combined, storage space can be saved.

With reference to the third implementation of the first aspect, in a fourth implementation of the first aspect, the performing matching according to a matching condition, an index item, or a keyword includes: performing matching according to at least one of: a user name, a phone number, or an email address. Contacts, with at least one of a user name field, a phone number field, or an email address field being the same are combined, so as to delete redundant data and save the storage space.

With reference to the second implementation of the first aspect, in a fifth implementation of the first aspect, contacts from different application programs are displayed in different manners in the common address book. Optionally, a group may be created in the common address book. Optionally, if the system detects that the address book of an application program changes, the system updates the imported or copied address book and the common address book. The contacts from different sources are displayed in different manners, so that the user can easily distinguish between the contacts.

After the content forwarding instruction is received, a menu including an option of forwarding to the second application program may pop up, and a specific invoking manner depends on a default option of the operating system or a user setting. Optionally, the operating system may alternatively prompt the user to select an address book to be invoked. Optionally, in the foregoing invoked address book, one or more forwarded-to objects may be selected by the user, or a group of contacts or all contacts may be selected for forwarding.

With reference to the first aspect, in a sixth implementation of the first aspect, the invoking and displaying the second address book specifically includes: displaying a menu for selecting the second address book in the first application program. The user may select a forwarded-to object in the selection menu.

With reference to the first aspect, in a seventh implementation of the first aspect, the selected content may be directly forwarded, or may be forwarded after appropriate modification is made to the selected content. For example, the selected content is encapsulated into a message, at least one of a first application program tag, sender information, or a sending time is added into the message, and then the message is sent to the determined contact. Optionally, the selected content, the first application program tag, the sender information, and the sending time are encapsulated into a message, and the message is sent to the determined contact by using a wireless network. In addition to the selected content, more information may be added into the encapsulated message, so that the selected contact can know about a source of the forwarded message.

Optionally, the forwarding the selected content may include: performing, by the first application program, processing such as decompression and decryption, to restore original data, and then filling in the content to be forwarded. A forwarding operation may be automatically performed by the system without user confirmation, may be performed after confirmed by the user, or is performed after the user edits the content to be forwarded. Optionally, the second application program may be requested to return a response packet indicating whether the forwarded content is received, or the operating system of the mobile terminal displays a prompt of whether the forwarding operation succeeds. Optionally, during the forwarding operation, a related process of the second application program may need to be invoked. An invoking manner may be a manner of being invoked on a system background or being navigated to an operation interface of the second application program. Further, after the user is navigated to the operation interface of the second application program and completes the forwarding operation, the user may be prompted to go back to an operation interface of the first application program.

With reference to any one of the first aspect or all the implementations of the first aspect, in a seventh implementation of the first aspect, the first application program is the short message service, and the second application program is the instant messaging tool.

The foregoing solution greatly improves convenience of forwarding content between different application programs, and prevents a security risk.

According to a second aspect, an embodiment of the present invention provides an apparatus, including a memory, a processor, a radio frequency circuit, and one or more programs. The one or more programs are stored in the memory and are configured to be executed by the processor. The one or more programs include an instruction, and the instruction is used to: associate a first address book of a first application program with a second address book of a second application program; when a content forwarding instruction is received, invoke and display the second address book, where the content forwarding instruction is used to forward selected content in the first application program to the second application program; determine a contact selected by a user; and forward the selected content to the determined contact. A specific method is the same as the method according to the first aspect.

According to a third aspect, an embodiment of the present invention provides an apparatus, including a memory, a processor, and a radio frequency circuit, where the processor associates a first address book of a first application program with a second address book of a second application program, where the first address book and the second address book are stored in the memory; when receiving a content forwarding instruction, the processor invokes and displays the second address book, and determines a contact selected by a user; and the processor forwards the selected content to the determined contact by using the radio frequency circuit. A specific method is the same as the method according to the first aspect.

According to a fourth aspect, an embodiment of the present invention provides an apparatus for forwarding content between different application programs, including an association unit, an invoking unit, a storage unit, and a forwarding unit. The association unit is configured to associate a first address book of a first application program with a second address book of a second application program. The invoking unit is configured to: when a content forwarding instruction is received, invoke and display the second address book, and determine a contact selected by a user. The forwarding unit is configured to forward the selected content to the determined contact.

With reference to the fourth aspect, in a first implementation of the fourth aspect, the association unit includes an obtaining unit, a matching unit, and an updating unit. The obtaining unit is configured to obtain, for the first application program, permission to read and copy the second address book of the second application program, and obtain, for the second application program, permission to read and copy the first address book of the first application program. The matching unit is configured to perform matching according to a matching condition, an index item, or a keyword, and combine successfully-matched contacts. The updating unit is configured to: when the first address book or the second address book changes, update the first address book or the second address book.

According to a fifth aspect, an embodiment of the present invention provides a computer storage medium for storing one or more programs, where the one or more programs include an instruction, and the instruction is used to perform the following operations: associating a first address book of a first application program with a second address book of a second application program; when a content forwarding instruction is received, invoking and displaying the second address book, where the content forwarding instruction is used to forward selected content in the first application program to the second application program; determining a contact selected by a user; and forwarding the selected content to the determined contact. A specific method is the same as the method according to the first aspect.

According to the foregoing solutions, content can be conveniently forwarded between the short message service and the instant messaging tool, and information security is ensured in a forwarding process. The solutions are of great use value.

DESCRIPTION OF EMBODIMENTS

The following clearly describes the technical solutions in the embodiments of the present invention in detail with reference to the accompanying drawings in the embodiments.

The embodiments of the present invention provide a method for forwarding content between different application programs. The method is applicable to all mobile terminals that have a wireless communications function, for example, a mobile phone and a wearable device (such as a smart band, a smartwatch, or smart glasses) that has a mobile communications function. An operating system loaded on the mobile terminal includes but is not limited to iOS®, Android®, Microsoft®, DOS, Unix, Linux, or another operating system.

Figure 1:
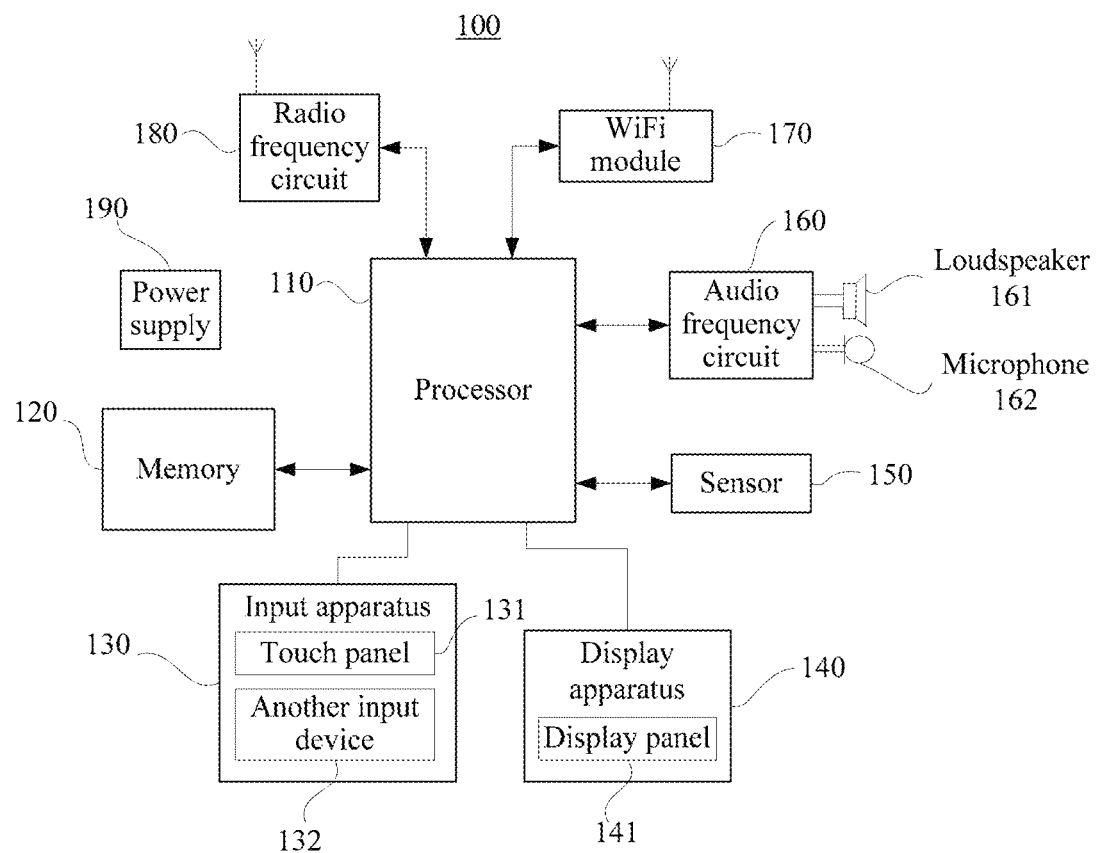
FIG. 1 is a schematic diagram of a hardware structure of a mobile phone according to an embodiment of the present invention.

FIG. 1 is a schematic diagram of an overall hardware structure of a mobile phone 100. It should be understood that the mobile phone 100 is only an example of the mobile terminal that has a mobile communications function, and the mobile phone 100 may have more or fewer components than those shown in the figure, a combination of two or more components, or components disposed or arranged differently. Various components shown in FIG. 1 may be implemented by using hardware, software, or a combination of hardware and software, and includes one or more signal processing and/or application-specific integrated circuits.

The mobile phone 100 includes a processor 110, a memory 120, an input apparatus 130, a display apparatus 140, a sensor 150, an audio frequency circuit 160, a WiFi module 170, a radio frequency circuit 180, and a power supply 190. These components communicate by using one or more communications buses or signal cables.

The processor 110, as a control center of the mobile phone 100, connects various parts of the mobile phone 100 by using various interfaces and lines, and executes various functions of the mobile phone 100 and processes data by running or executing a software program and/or an instruction set stored in the memory 120 and invoking data stored in the memory 120, so as to perform overall monitoring on the mobile phone 100. Optionally, the processor 110 may include one or more processing units. Optionally, an application processor and a modem may be integrated in the processor 110. The application processor mainly processes an operating system, a user interface, an application program, and the like, and the modem mainly processes radio communication. It can be understood that the modem may be not integrated in the processor 110. In some embodiments, the processor 110 may include an image signal processor and a dual-core/multi-core processor.

The memory 120 may be configured to store a software program and a function module. The processor 110 executes various function applications of the mobile phone 100 and processes data by running the software program and the function module stored in the memory 120. The memory 120 may mainly include a program storage area and a data storage area. The program storage area may store an operating system, an application program required by at least one function (for example, an audio playback function and an image playback function), and the like. The data storage area may store data (for example, audio data and a phone book) created according to usage of the mobile phone 100, and the like. In addition, the memory 120 includes a high-speed random access memory, and further includes a non-volatile memory such as at least one disk storage device, a flash memory device, or another volatile solid-state storage device. The memory 120 may store various operating systems, for example, a Windows operating system of Microsoft and an Android operating system developed by Google. In some embodiments of the present invention, an address book of a short message service, an address book of WeChat, and a common address book may be stored in the memory 120.

The input apparatus 130 may be configured to receive input numerical or character information and generate a key signal input related to user setting and function control of the mobile phone 100. Specifically, the input apparatus 130 may include a touch panel 131 and another input device 132. The touch panel 131, also referred to as a touchscreen, may collect a touch operation performed by a user on or near the touch panel 131 (for example, an operation performed on or near the touch panel 131 by the user by using a finger, a stylus, or any other suitable part or object), and drive a corresponding connection apparatus according to a preset program. Optionally, the touch panel 131 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, and sends the contact coordinates to the processor 110; and can receive command sent by the processor 110 and execute the command. In addition, the touch panel 131 may be implemented in multiple types, such as a resistive type, a capacitive type, an infrared type, and a surface acoustic wave type. In addition to the touch panel 131, the input apparatus 130 may include the another input device 132. Specifically, the another input device 132 includes but is not limited to one or more of a physical keyboard, a function key (such as a volume control key, a switch key, or a Home key), a trackball, a mouse, a joystick, or the like. In this embodiment of the present invention, user input received by the mobile terminal may be input by using the touch panel 131, or may be input by the another input device 132. This is not limited herein.

Specifically, the touch panel 131 includes a touch-sensitive surface (touch-sensitive surface). The touch-sensitive surface is configured to perform various operations related to touch detection, for example, determining whether contact has occurred (for example, detecting a finger press event), determining a pressure value and coordinate information of a touch, determining whether there is a contact movement and tracking the movement on the entire touch-sensitive surface (for example, detecting a one- or multiple-finger drag event), and determining whether the contact has been terminated (for example, detecting a finger lift event or a contact interruption). Determining a movement of a contact point may include determining a speed (a value), a velocity (a value and a direction), and/or an acceleration (a value and/or direction change) of the contact point. The movement of the contact point is indicated by a series of contact data. These operations may be applied to a single-point touch (for example, a one-finger touch) or a simultaneous multi-point touch (for example, a "multiple-point touch"/a multiple-finger touch). Touch detection technologies include but are not limited to capacitive, resistive, infrared, and surface acoustic wave technologies.

It should be noted that, the touch panel 131 should be understood as a generalized touch input device, and the touch-sensitive surface may be integrated with a display screen, or may be separated from a display screen and connected to the system as a separate touch input device, for example, coordinated mouse moving and mouse button pressing (with or without a single or multiple keyboards being pressed or held), moving, tapping, dragging, scrolling, or the like, by a user on a touchpad, stylus input, a device movement, an oral instruction, a detected eye movement, biometric feature input, and/or any combination thereof. The touch-sensitive surface and the display screen may be used as touch input devices. Although the following embodiments are mainly described with reference to finger input (for example, a single-finger touch, a single-finger tap gesture, and a single-finger swipe gesture), it should be understood that in some embodiments, one or more of these finger inputs may be replaced with input (for example, the stylus input) from another touch input device.

In this specification, unless otherwise specified, a user gesture is flexible, and may be a tap, a double tap, circle drawing, line drawing, a one-finger touch, a multiple-finger touch, or the like. A person of ordinary skill in the art can understand that a specific gesture may be selected flexibly, provided that a basically identical effect can be achieved. In this specification, unless otherwise specified, a location or an area on the touch-sensitive surface, on which the user gesture acts, is also flexible, and may be an area or a nearby area in which the display screen displays an application interface element, a blank area in which the display screen does not display an application interface element, an area in which the display screen displays a function setting, and the like. A person of ordinary skill in the art can understand that a specific location or area on the touch-sensitive surface, on which a gesture acts, may be flexibly set, provided that a basically identical effect can be achieved.

The display apparatus 140 may be configured to display information entered by a user or information provided for the user and various menus of the mobile phone 100. The display apparatus 140 may include a display panel 141. Optionally, the display panel 141 may be configured in a form of an LCD (liquid crystal display), an OLED (organic light-emitting diode), or the like. Further, the touch panel 131 may cover the display panel 141. After detecting a touch operation on or near the touch panel 131, the touch panel 131 transmits information about the touch operation to the processor 110 to determine a touch event type. Then, the processor 110 provides a corresponding visual output on the display panel 141 according to the touch event type. The visual output includes a text, a graph, an icon, a video, and any combination thereof. In some embodiments, some or all of the visual outputs may be corresponding to a user interface object. In FIG. 1, the touch panel 131 and the display panel 141 act as two independent components to implement input and output functions of the mobile phone 100. However, in some embodiments, the touch panel 131 and the display panel 141 are integrated to implement the input and output functions of the mobile phone 100.

The mobile phone 100 may further include a sensor 150, such as a light sensor, a motion sensor, and another sensor. Specifically, the light sensor may include an ambient light sensor and a proximity sensor. The ambient light sensor may adjust luminance of the display panel 141 according to brightness of ambient light. The proximity sensor may turn off the display panel 141 and/or backlight when the mobile phone 100 moves close to an ear. As a type of motion sensor, an accelerometer sensor may detect accelerations in all directions (three axes in general), may detect, in a stationary state, a value and a direction of gravity, and may be applied to a mobile phone posture recognition application (for example, screen switching between a landscape mode and a portrait mode, a related game, and magnetometer posture calibration), a vibration recognition related function (for example, a pedometer or a tap), and the like. Optionally, other sensors, such as a gyroscope, a barometer, a hygrometer, a thermometer, and an infrared sensor, may also be configured in the mobile phone 100, and details are not described herein.

The mobile phone 100 may further include the audio frequency circuit 160. A loudspeaker 161 and a microphone 162 may provide an audio interface between the user and the mobile phone 100. The audio frequency circuit 160 may transmit, to the loudspeaker 161, an electrical signal that is obtained by converting received audio data. The loudspeaker 161 converts the electrical signal into a sound signal and outputs the sound signal. In addition, the microphone 162 converts a collected sound signal into an electrical signal. The audio frequency circuit 160 receives the electrical signal, converts the electrical signal into audio data, and outputs the audio data to the processor 110 for processing. The processed audio data is sent to another mobile phone by using the RF circuit 180, or the audio data is output to the memory 120 for further processing. In some embodiments, the audio frequency circuit 160 further includes a headset jack. The headset jack provides an interface between the audio circuit 160 and a removable audio input/output peripheral device. The peripheral device is, for example, a headset supporting only output or a headset supporting both output (for example, a single-earpiece or double-earpiece earphone) and input (for example, a microphone).

The radio frequency (RF, Radio Frequency) circuit 180 may be configured to: send and receive information, or send and receive a signal during a call, convert an electrical signal into an electromagnetic signal or convert an electromagnetic signal into an electrical signal, and communicate with a communication network and another communications device by using the electromagnetic signal, and specially, receive downlink information of a base station and send the downlink information to the processor 110 for processing; and send related uplink data to the base station. The radio frequency circuit 180 may include a well-known circuit system for performing these functions, including but not limited to an antenna system, a radio frequency transceiver, one or more amplifiers, a tuner, one or more oscillators, a digital signal processor, a codec chipset, a SIM (Subscriber Identity Module, subscriber identity module) card, and the like. The radio frequency circuit 180 may communicate with a network and another device by means of wireless communications. The network is, for example, the Internet, an intranet, and/or a wireless network (such as a cellular phone network, a wireless local area network, and/or a metropolitan area network). Any of multiple communications standards, protocols, or technologies may be used in wireless communications, including but not limited to a Global System for Mobile Communications, an enhanced data GSM environment, high speed downlink packet access, high speed uplink packet access, Wideband Code Division Multiple Access, Code Division Multiple Access, Time Division Multiple Access, Bluetooth, wireless fidelity (for example, IEEE 802.11a, IEEE 802.11b, IEEE 802.11g, and/or IEEE 802.11n), Voice over Internet Protocol, Wi-MAX, an email protocol (for example, Internet Content Access Protocol (IMAP) and/or Post Office Protocol (POP)), instant content (for example, Extensible Messaging and Presence Protocol (XMPP), SIP for Instant Messaging and Presence Leveraging Extensions (SIMPLE), and Instant Messaging and Presence Service (IMPS)), and/or a short message service (SMS), or any other appropriate communication protocols, including a communications protocol that has not yet been developed by the submission date of this document. In some embodiments of the present invention, transmission and reception of a short message service is implemented by using the radio frequency circuit 180.

The power supply 190 is configured to supply power to the mobile phone 100 and perform power management. Specifically, the power supply 190 may include a power management system, one or more power supplies (for example, a battery and an alternating-current power source), a recharging system, a power failure detection circuit, a power converter or inverter, a power status indicator (for example, a light emitting diode), and any other component associated with generation, management, and distribution of electricity in the mobile phone.

Although not shown, the mobile phone 100 may further include a camera, a Bluetooth module, or the like, and details are not described herein.

A traditional short message service, including a short message service (Short Message Service, SMS) and a multimedia message service (Multimedia Message Service, MMS), is transmitted by using a wireless communications network, and is a non-real-time data communication service that is mainly used to transmit a text and an image. The traditional short message service has disadvantages such as relatively high costs, a limited variety of content that can be transmitted, and a limited capacity in a single transmission. For ease of description, the term "short message service" in the embodiments of the present invention includes the short message service and the multimedia message service.

Figure 2A:
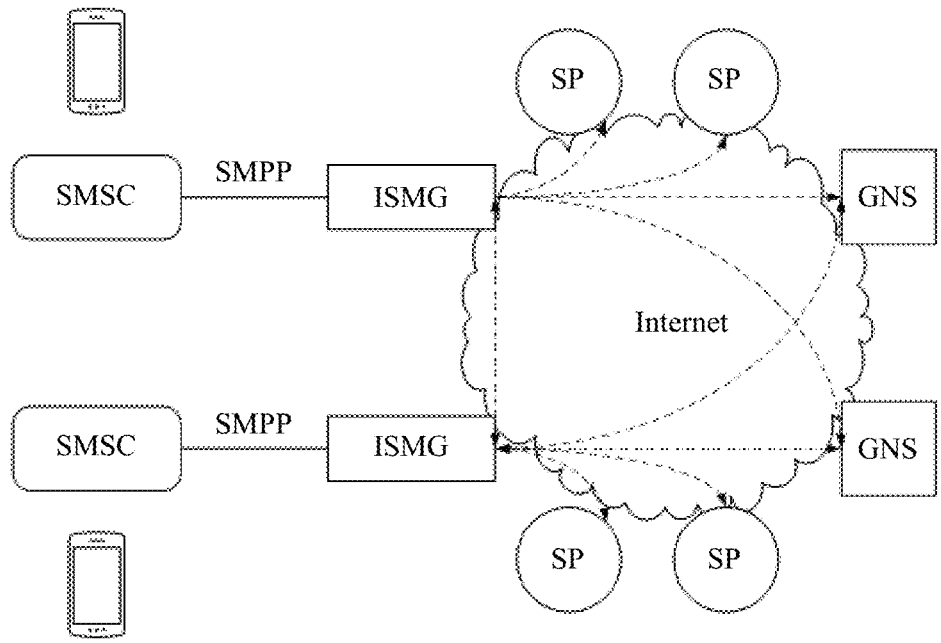
FIG. 2A is a schematic diagram of a short message service transmission system according to an embodiment of the present invention.

Referring to FIG. 2A, participating entities of a short message service include: a service provider (service provider, SP for short), which is an information provider of an SMS information service; an Internet short message gateway (Internet short message gateway, ISMG for short), which provides a data exchange channel between the SP and a short message service center; the short message service center (short message service center, SMSC for short), which sends an SMS message to a mobile phone user by using a signaling network; and a gateway name server (gateway name server, GNS for short), which provides route lookup and route update for the ISMG A short message service process includes a sending stage and a receiving stage.

Figure 2B:
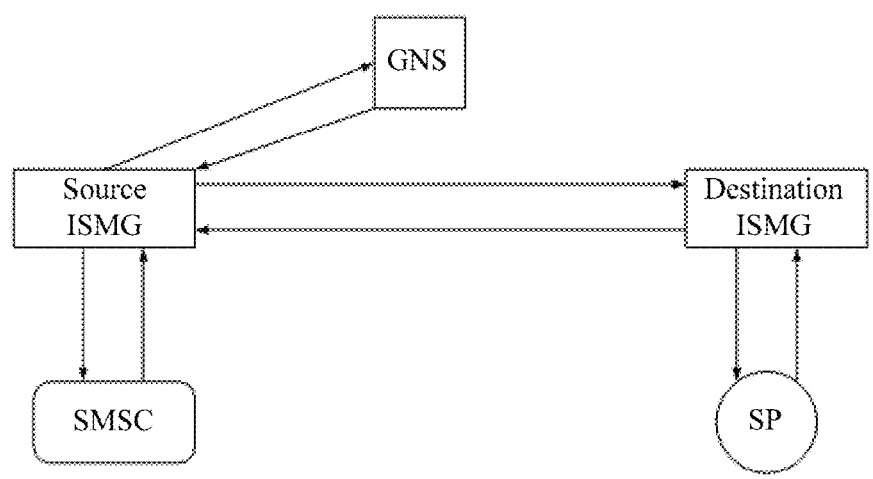
FIG. 2B is a schematic diagram of sending a short message service according to an embodiment of the present invention.

Referring to FIG. 2B, during the sending stage, a home SMSC of a user sends, by using the SMPP (short message peer to peer) protocol, SMS message data to an ISMG that is responsible for connecting to the SMSC, and the ISMG sends the SMS message data to a corresponding SP according to a sender number (that is, a service code of the SP) for processing by the corresponding SP. The processing performed by the corresponding SP specifically includes: If the SP is an SP to which the ISMG is responsible for connecting, the ISMG directly performs forwarding; if the SP is not an SP to which the ISMG is responsible for connecting, the ISMG needs to look up a route from a GNS, and forward the SMS message data to a responsible ISMG according to a route lookup result, and the responsible ISMG forwards the SMS message data to the SP.

Figure 2C:
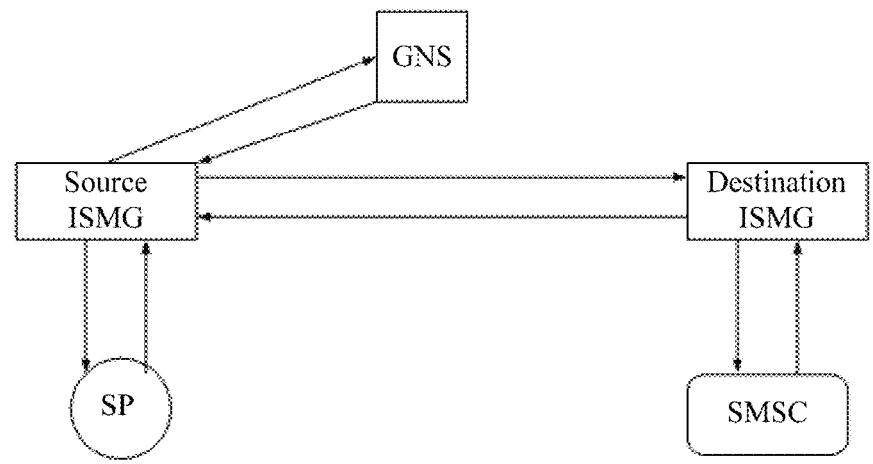
FIG. 2C is a schematic diagram of receiving a short message service according to an embodiment of the present invention.

Referring to FIG. 2C, during the receiving stage, the SP that provides the service sends the SMS message data to the connected ISMG, and the ISMG determines a home location of a target user according to a mobile phone number of the target user, and sends, by using the SMPP protocol, the SMS message data to an SMSC serving the target user. A process of determining the home location is: If the ISMG is responsible for connecting to the SMSC, the ISMG directly sends the SMS message data to the SMSC; otherwise, the ISMG looks up a route from the GNS, and sends, according to a lookup result, the SMS message data to an ISMG that is responsible for connecting to the SMSC, and then this ISMG sends the SMS message data to the SMSC at the home location, so that the SMS message data is sent to the target user.

Instant messaging (IM) is a technology that instantly delivers, based on a data network, content in a multimedia format such as a text, an image, a voice, and a video, and has now become an integrated information platform of communication, information, entertainment, search, e-commerce, office collaboration, corporate customer service, and the like. A user can send and receive content by using a terminal, such as a mobile phone or a computer, on which client software is installed. Compared with a traditional communication manner, instant messaging is faster, more convenient, less expensive, and more confidential. Most instant messaging tools have a software/application program across operating system platforms, and support a function of fast sending content between telecom operators. In some embodiments of the present invention, an instant messaging tool "WeChat" (WeChat) is used as an example for describing a method for forwarding content between different communication application programs. It can be understood that these methods are also applicable to other instant messaging tools.

Figure 3:
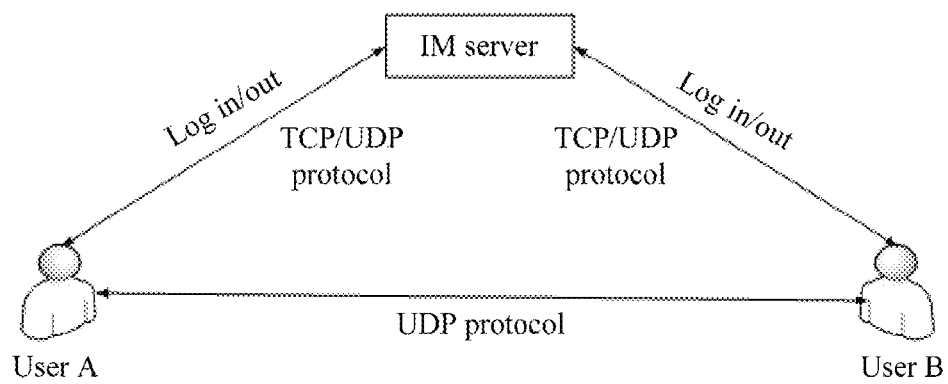
FIG. 3 is a schematic diagram of an instant messaging service transmission system according to an embodiment of the present invention.

Referring to FIG. 3, instant messaging participants include an IM server and a user. The instant messaging mainly relates to two protocols: the UDP (User Datagram Protocol, User Datagram Protocol) protocol, updating a content list and loading pushed content; and the TCP (Transmission Control Protocol, Transmission Control Protocol) protocol, ensuring that a user is in an online state.

The TCP protocol provides a connection-oriented, reliable byte stream service. Before a client and a server exchange data, a TCP connection needs to be established between the two parties. After to-be-transmitted data is segmented and packetized, a continuous two-way file transmission that strictly guarantees data correctness is performed by using a virtual circuit established between two machines. The TCP provides functions such as timeout retransmission, duplicate data discard, data check, and flow control, to ensure that data can be transmitted from one end to another.

The UDP protocol is a simple datagram-oriented transport layer protocol. The UDP does not ensure reliability. The UDP merely sends a datagram transmitted by an application program to an IP layer, but has no requirement on an arrival sequence of the segmented data, and cannot ensure that the segmented data can arrive at a destination. Because the UDP does not need to establish a connection between the client and the server before the datagram is transmitted, and a mechanism such as timeout retransmission is not available, a transmission speed is quite high.

WeChat is used as an example. When a user logs in to WeChat, the user is kept online by using the TCP protocol. During content sending, the UDP protocol is used to send the content to a server for forwarding. To ensure transmission reliability, when the user sends the content, the server receives the content packet, and needs to return a response packet by using the UDP protocol, so as to ensure that the content can be transmitted without any loss.

Regardless of function complexity, instant messaging systems are mostly based on a same technical principle, mainly including a client/server (Client/Server, C/S for short) communication mode and a peer to peer communication (peer to peer, P2P for short) mode. According to technical principles of WeChat, the peer to peer communication mode is mainly used, and the peer to peer communication mode is an asymmetric center structure. Clients (Peer) are participating peers, and each assumes two roles: a service user and a service provider. The clients communicate with each other directly. In addition, without centralized control by a central node, the system is highly scalable, a single point failure can be avoided, and failure tolerance of the system is improved. However, because a P2P network is distributed, autonomous, and dynamic, a result of client access is unpredictable in some cases. For example, no response content feedback may be received for a request. Most currently-used IM systems use the C/S and the P2P modes in combination. In a stage of login to the IM for authentication, the C/S mode is used. Then, if clients can directly communicate with each other, the P2P mode is used; otherwise, the C/S mode is used so that the clients communicate by using the IM server.

A mobile terminal on which an instant messaging application program is installed is both a server (Server) and a client (Client). During an instant messaging process, if a connection with a recipient is relatively stable, the content is transmitted directly by using the UDP; and if the connection is not quite stable, the content is forwarded by the IM server.

As the mobile Internet evolves, it is increasingly common for a user to use an instant messaging tool by using a mobile terminal such as a mobile phone, and market shares of the short message service are gradually occupied by the instant messaging tools. However, instant chat tools cannot completely take the place of the short message service in a short time due to signal coverage and other reasons, and the two kinds of services will coexist for a long time. Therefore, a user has a requirement for forwarding content between different application programs in real life, for example, forwarding from the short message service to WeChat or forwarding from WeChat to the short message service. A forwarding operation may be implemented by using an address book. The address book (also called a contact list, a phone book, a buddy list, and the like) is an application/service that is used to store a list of contact information. The contact information generally includes a user name (or a name), a phone number, an email address, and the like. Generally, an address book of the short message service is stored in a database of a mobile terminal, and a user can perform an operation such as finding, adding, and deleting a contact. An address book of an instant messaging application program may be stored in the database of the mobile terminal, or in a storage device of a network service provider.

It should be understood that, in this specification, the "first" and "second" are merely used to distinguish between two different application programs, such as the short message service and the instant messaging tool, and are not intended to limit the application programs. For example, a first application program may also be referred to as a second application program, and the second application program may also be referred to as the first application program. In some embodiments of the present invention, the first application program is the short message service, and the second application program is the instant messaging tool. In some other embodiments of the present invention, the first application program is the instant messaging tool, and the second application program is the short message service.

Figure 4:
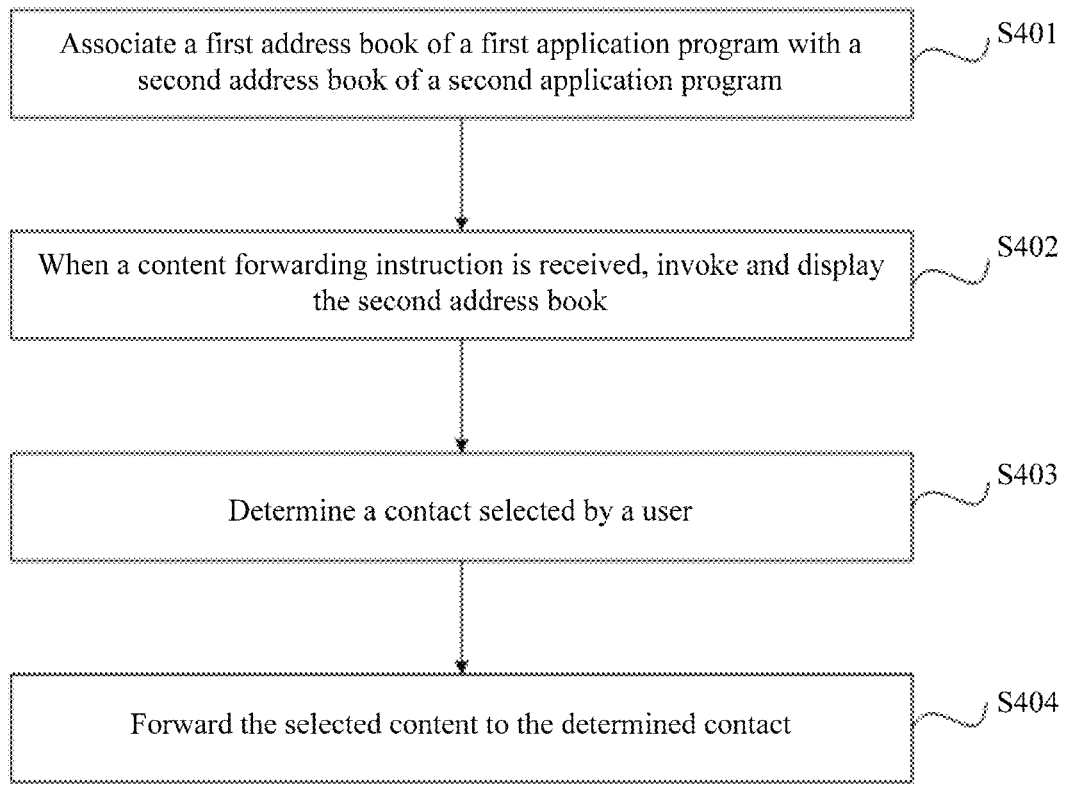
FIG. 4 is a flowchart of a method for forwarding content between different application programs according to an embodiment of the present invention.

Referring to FIG. 4, an embodiment of the present invention provides a method for forwarding content between different application programs, including the following steps specifically.

S401. Associate a first address book of a first application program with a second address book of a second application program.

To implement association between an address book of a short message service and an address book of an instant messaging tool, the instant messaging tool needs to obtain, from an operating system, corresponding control permission, such as permission to read and copy a system address book. To obtain permission, during installation or use of an instant messaging application program, the instant messaging application program may apply to the operating system for the related permission, or ask for user consent for obtaining the related permission.

A method for forwarding content between the short message service and the instant messaging tool can be used only when allowed by the system or the user. A mobile phone running an Android system is used as an example. If a local address book needs to be invoked, permission needs to be added to an AndroidManifest.xml file. For example, permission to read an address book may be obtained by adding <uses-permission android:name="android.permission.READ_CONTACTS"/>. For another example, permission to create (write) an address book may be obtained by adding <uses-permission android:name="android.permission.WRITE_CONTACTS"/>.

During the association, the two communications application programs import or copy the address books from the peer, or a common address book is generated by means of combination. For example, the first application program imports or copies the address book of the second application program to the first application program, and the second application program imports or copies the address book of the first application program to the second application program. Generating a common address book by means of combination includes adding up contact lists of the address books of the two application programs, performing matching according to a matching condition, an index item, or a keyword, and combining successfully-matched contacts. The matching condition, the index item, or the keyword includes one or a combination of: a user name (an instant messaging tool identity or a name in the address book of the short message service), a phone number, or an email address. The finally-formed common address book may include only a list of successfully-matched contacts, or may include a list of successfully-matched contacts and a list of unsuccessfully-matched contacts. Further, the common address book may be stored in a mobile terminal locally or in the two application programs.

Optionally, in the common address book, contacts from different application programs may be displayed in different manners, for example, in different colors, labels, or fonts. Optionally, a group may be created in the common address book. Optionally, if the system detects that the address book of an application program changes, the system updates the imported or copied address book and the common address book, including adding, deleting, and modifying contact information, and the like.

S402. When a content forwarding instruction is received, invoke and display the second address book, where the content forwarding instruction is used to forward selected content in the first application program to the second application program.

The user selects, in the first application program, the content to be forwarded to the second application program, and triggers the content forwarding instruction. The content forwarding instruction is used to forward the selected content in the first application program to the second application program. After receiving the content forwarding instruction, the mobile terminal invokes the address book of the second application program or the common address book, for the user to select a forwarded-to object. The to-be-forwarded content may be a text, a picture, a contact card, an emoji expression, a website address, audio, a video, or the like.

A manner of triggering the content forwarding instruction is not limited. A common manner is, for example, pressing and holding to-be-forwarded content (including a touch technology such as a 3D-Touch technology), a gesture such as pinch and stretch, rotating a mobile terminal, shaking a mobile terminal, sliding on a screen by using a finger or a stylus, pressing one or more substantive keys (such as a Home key, a volume key, a back key, a menu key, a power key, or any combination of these keys), or speech recognition and wake-up (such as Sin of an iOS system), or may be any combination of these manners.

When the content forwarding instruction is received, the second address book of the second application program is invoked and displayed. Optionally, after a forwarding operation instruction is triggered, a menu including an option of forwarding to the second application program may pop up in the first application program. The menu may be presented in multiple manners. For example, in this menu, the option of forwarding to the second application program may be displayed in a level 1 menu, a level 2 menu, or another menu, and this is not limited herein. For another example, the menu may pop up in multiple manners, for example, may be displayed on a page on which the to-be-forwarded content is displayed, or may pop up on a new page. It can be understood that the menu may have another option, such as favorites, save, delete, and forward in the application program.

S403. Determine a contact selected by a user.

When the second address book of the second application program is invoked and displayed, a menu of a selected contact in the second address book may be displayed in the first application program, so as to determine the contact selected by the user. When the operation instruction of forwarding to the second application program is detected, the mobile terminal invokes an address book for the user to select the forwarded-to object. The address book may be the address book of the second application program or the common address book. A specific invoking manner depends on a default option of the operating system or a user setting. Optionally, the mobile terminal may prompt the user to select a to-be-invoked address book.

For example, when content is forwarded from WeChat to the short message service, an invoked address book may be an address book used by the short message service (generally a local address book of a mobile terminal), or may be a common address book generated after an address book of WeChat is associated with an address book of the short message service. Similarly, for example, when content is forwarded from the short message service to WeChat, an invoked address book may be an address book of WeChat, or may be a common address book generated after an address book of WeChat is associated with an address book of the short message service. In the foregoing invoked address book, one or more forwarded-to objects may be selected by the user, or a group of contacts or all contacts may be selected for forwarding.

S404. Forward the selected content to the determined contact.

The mobile terminal forwards the selected content to the determined contact. The mobile terminal may directly forward the selected content to the determined contact, or may make appropriate modification to the selected content and forward the modified content to the determined contact. Optionally, the selected content, a first application program tag, sender information, and a sending time are encapsulated into a message, and the message is sent to the determined contact by using a wireless network. Encapsulation into a message means converting the selected content in the first application program to a content format supported by the second application program, so that the selected content can be received by the second application program. Specifically, the encapsulation may include steps such as encryption and compression. Optionally, based on secure information transmission, bandwidth saving, or other considerations, the forwarded content may undergo processing such as compression and encryption by the first application program. If the forwarded content is directly sent, a user of the second application program may receive garbled characters. In this case, the first application program may first perform processing such as decompression and decryption, to restore original data, and then fill into the forwarded content. Because the foregoing processing such as compression and encryption, or decompression and decryption is performed inside a same application program, there is no technical obstacle in operation.

A forwarding operation may be automatically performed by the system without user confirmation, may be performed after confirmed by the user, or is forwarded after the user edits the forwarded content. Optionally, the second application program may be requested to return a response packet indicating whether the forwarded content is received, or the operating system of the mobile terminal displays a prompt of whether the forwarding operation succeeds. Optionally, during the forwarding operation, a related process of the second application program may need to be invoked. An invoking manner may be a manner of being invoked on a system background or being navigated to an operation interface of the second application program. Further, after the user is navigated to the operation interface of the second application program and completes the forwarding operation, the user may be prompted to go back to an operation interface of the first application program.

The foregoing method can improve convenience of forwarding content between different application programs, and avoid a potential technical difficulty and a potential security risk. This method does not require a service provider to provide server support, avoiding a privacy risk and traffic costs caused by uploading of the forwarded content to a server. The method does not need participation of a third party software or application program, and is executed in an operating system of the same mobile terminal in the whole process, ensuring information security. The forwarded content can be parsed inside a source application program without technical obstacles, and functions of the short message service and the instant messaging tool are enriched. Therefore, the method is of great practical value.

Figure 5:
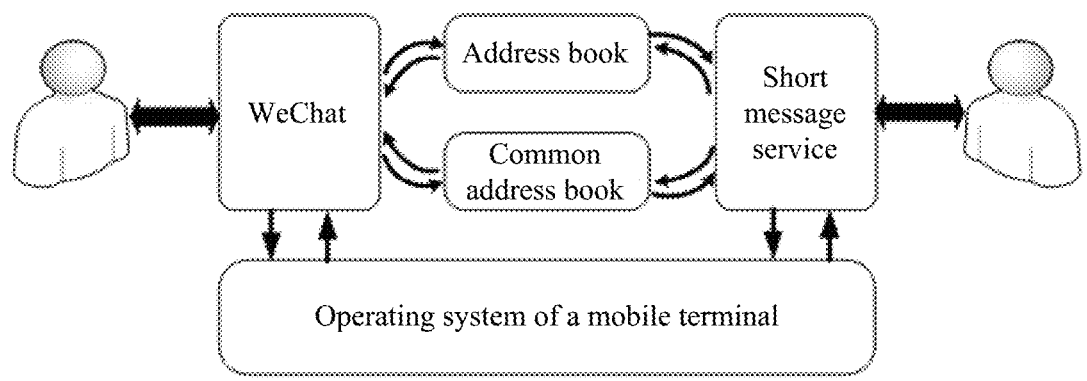
FIG. 5 is a schematic principle diagram of forwarding content between a short message service and WeChat according to an embodiment of the present invention.

Referring to FIG. 5, a principle of forwarding content between a short message service and an instant messaging tool (for example, WeChat) by using the foregoing method is as follows: After a user selects, in a first application program (for example, WeChat), content to be forwarded, the content may be forwarded to a target user of a second application program (for example, the short message service) in two ways: one is to forward by using an address book of the second application program (for example, the short message service), and the other is to forward by using a common address book generated after the first application program (for example, WeChat) is associated with the second application program (for example, the short message service).

Specifically, when receiving an instruction of forwarding from the first application program (for example, WeChat) to the second application program (for example, the short message service), for example, detecting that a user triggers a forwarding option, an operating system of a mobile terminal invokes an address book in one of the foregoing two ways, for the user to select a forwarded-to object, and then forwards the content to the forwarded-to object. Optionally, a related process of the second application program may be invoked during forwarding.

The operating system of the mobile terminal is responsible for communicating with the two application programs, for example, invoking the related process of the second application program, and displaying a forwarding status prompt (forwarding success or failure). Optionally, the common address book may be stored in the mobile terminal for invoking.

FIG. 6A, FIG. 6B, FIG. 6C, and FIG. 6D are a process of forwarding content from WeChat to a short message service. Steps are described as follows.

Figure 6A:
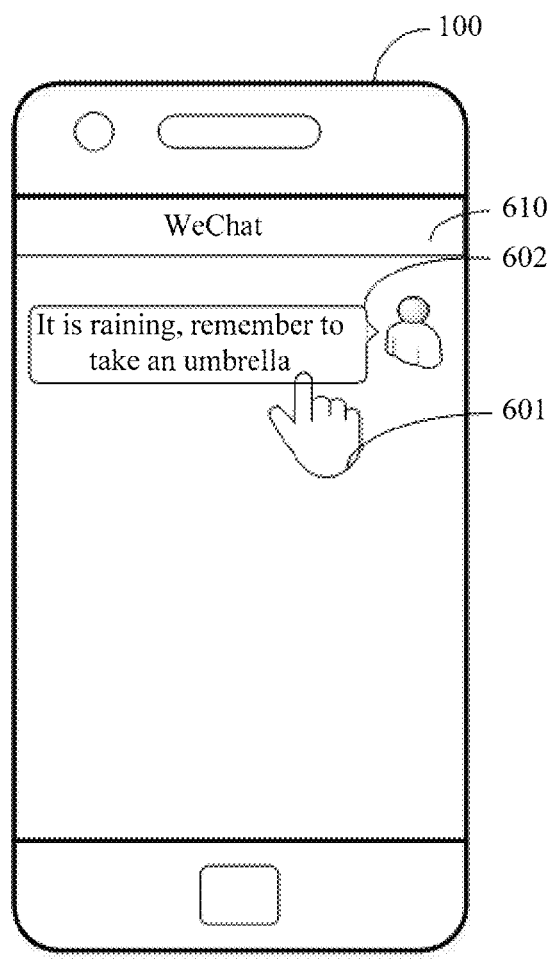
FIG. 6A is a schematic diagram of selecting to-be-forwarded content in WeChat according to an embodiment of the present invention.

Referring to FIG. 6A, content 602 to be forwarded is selected on a WeChat chat screen 610 on a mobile phone 100. The content may be received by a user or sent by the user. In the figure, the content 602 is sent by the user. As described in S402, the forwarded content is diverse, and actions of triggering a forwarding operation are also diverse. In FIG. 6, the user triggers a forwarding instruction by pressing and holding the content by using a finger 601.

Figure 6B:
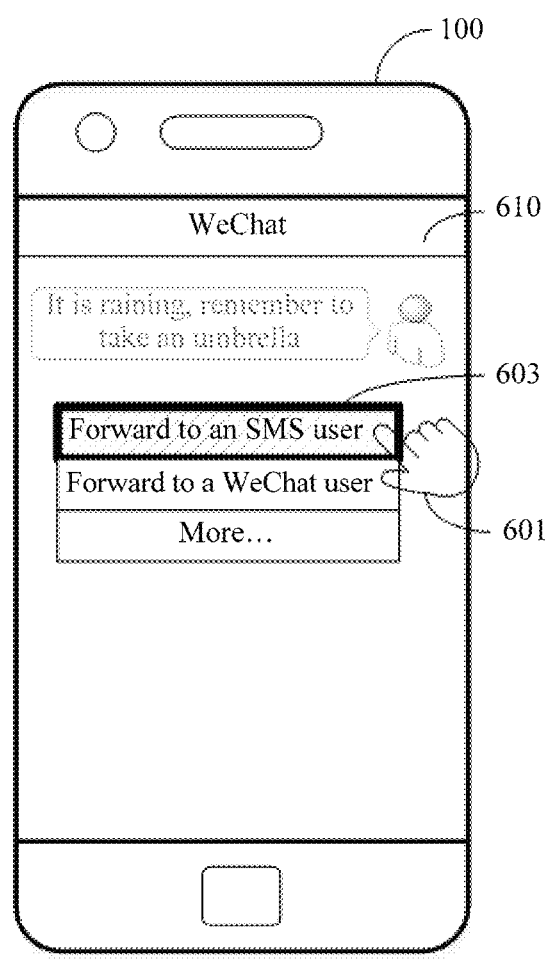
FIG. 6B is a schematic diagram of displaying a forwarding menu in WeChat according to an embodiment of the present invention.

Referring to FIG. 6B, after the forwarding instruction is triggered, the mobile phone 100 presents a menu 603 including a "forward to an SMS user" option on the WeChat chat screen 610. As described in S402, the menu may be presented in various manners. In FIG. 6, an address book of the short message service may be invoked by using the "forward to an SMS user". After the user taps the "forward to an SMS user" option by using the finger 601, a next step (FIG. 6C) is performed.

Figure 6C:
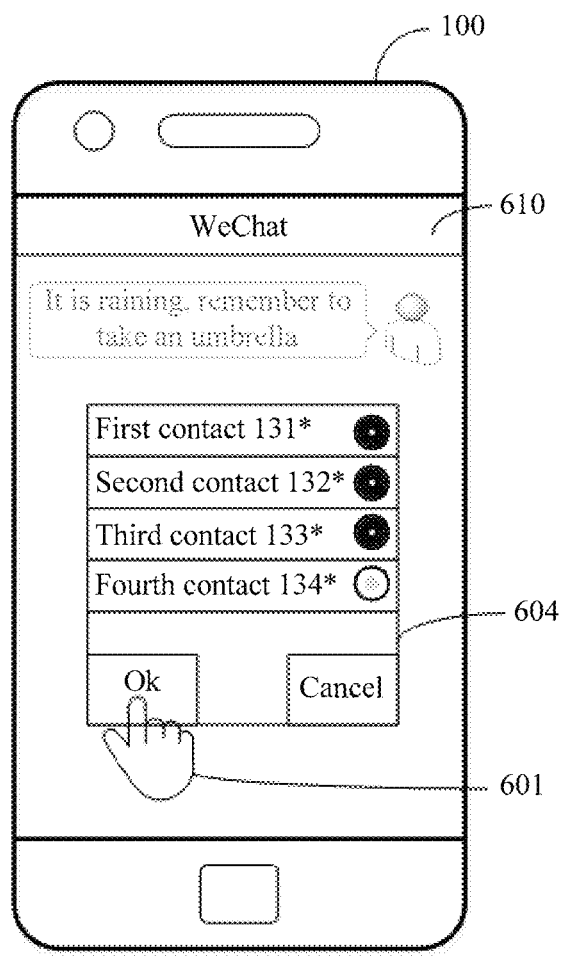
FIG. 6C is a schematic diagram of selecting a forwarded-to object in WeChat according to an embodiment of the present invention.

Referring to FIG. 6C, the mobile phone 100 presents an address book 604 of the short message service on the WeChat chat screen 610 for the user to select a forwarded-to object. As described above, the invoked address book may be an address book of the short message service (generally a local address book of the mobile terminal), or may be a common address book generated by associating an address book of WeChat with the address book of the short message service. In FIG. 6, the address book 604 of the short message service may be invoked. As described in S402, one or more target objects may be selected from the address book. In FIG. 6, three target objects are selected.

Figure 6D:
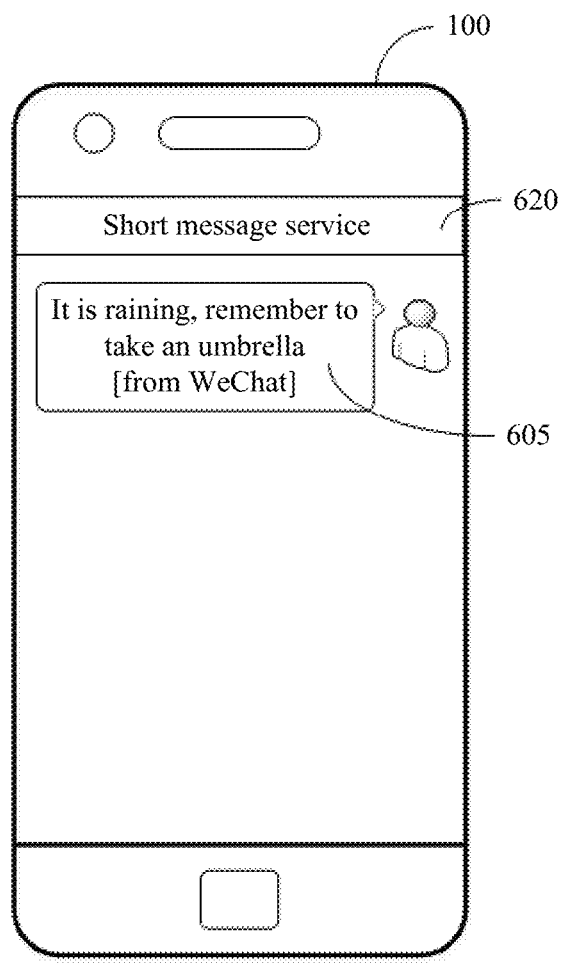
FIG. 6D is a schematic diagram of receiving forwarded content in a short message service according to an embodiment of the present invention.

Referring to FIG. 6D, the mobile phone 100 forwards the selected content to the target object and presents forwarded content 605 at a short message service interface 620. In the figure, the content 605 includes a first application program tag, indicating that the content 605 is forwarded from WeChat. It can be understood that information such as sender information and a sending time may also be added to the selected content.

It can be understood that, a principle of forwarding content from the short message service to WeChat is slimier to that of FIG. 6, and details are not repeated herein.

Figure 7:
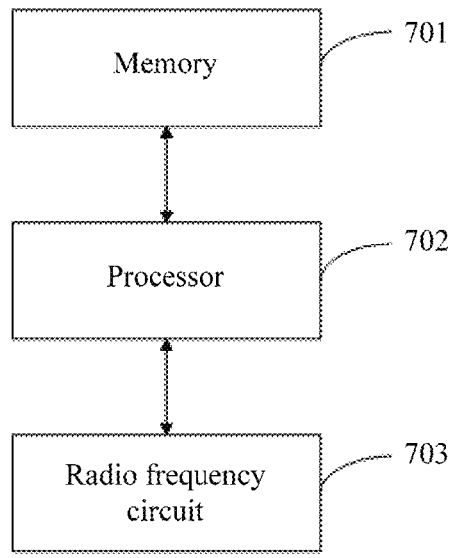
FIG. 7 is a schematic diagram of an apparatus according to an embodiment of the present invention.

In addition, referring to FIG. 7, an embodiment of the present invention provides an apparatus, including a memory 701, a processor 702, and a radio frequency circuit 703. The processor 702 associates a first address book of a first application program and a second address book of a second application program, where the first address book and the second address book are stored in the memory 701. When receiving a content forwarding instruction, the processor 702 invokes and displays the second address book, and determines a contact selected by a user, where the content forwarding instruction is used to forward selected content in the first application program to the second application program. The processor 702 forwards the selected content to the determined contact by using the radio frequency circuit 703. A specific method is the same as the method for forwarding content between different application programs.

In addition, an embodiment of the present invention provides an apparatus, including a memory, a processor, a radio frequency circuit, and one or more programs. The one or more programs are stored in the memory and are configured to be executed by the processor. The one or more programs include an instruction, and the instruction is used to: associate a first address book of a first application program with a second address book of a second application program; when a content forwarding instruction is received, invoke and display the second address book, where the content forwarding instruction is used to forward selected content in the first application program to the second application program; determine a contact selected by a user; and forward the selected content to the determined contact. A specific method is the same as the method for forwarding content between different application programs.

Figure 8:
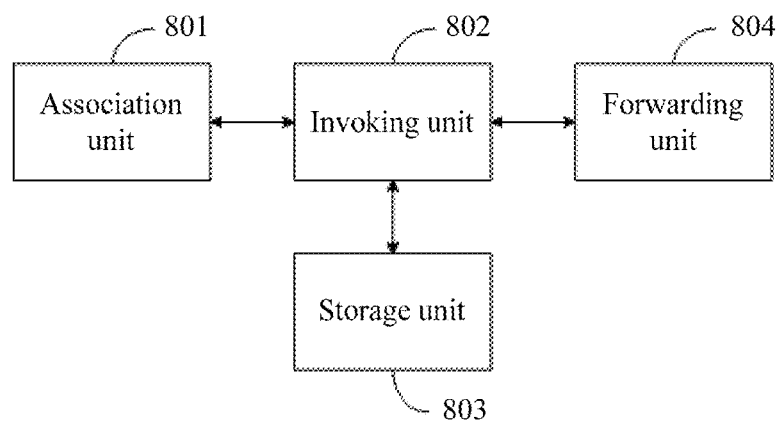
FIG. 8 is a schematic diagram of an apparatus for forwarding content between different application programs according to an embodiment of the present invention.

In addition, referring to FIG. 8, another embodiment of the present invention provides an apparatus for forwarding content between different application programs, including an association unit 801, an invoking unit 802, a storage unit 803, and a forwarding unit 804. The association unit 801 associates a first address book of a first application program with a second address book of a second application program, where the first address book and the second address book are stored in the storage unit 803. When a content forwarding instruction is received, the invoking unit 802 invokes and displays the second address book of the second application program, and determines a contact selected by a user. The forwarding unit 804 forwards the selected content to the determined contact.

Figure 9:
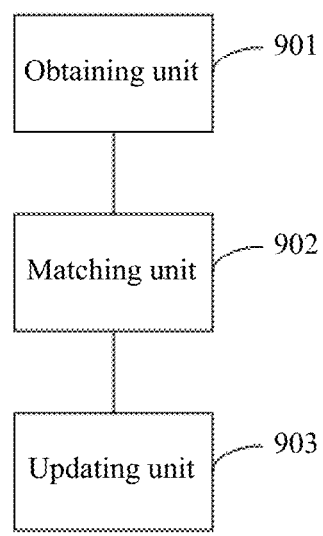
FIG. 9 is a schematic structural diagram of an association unit according to an embodiment of the present invention.

Referring to FIG. 9, the association unit 801 specifically includes an obtaining unit 901, a matching unit 902, and an updating unit 903. The obtaining unit 901 is configured to obtain, for the first application program, permission to read and copy the second address book of the second application program, and obtain, for the second application program, permission to read and copy the first address book of the first application program. The matching unit 902 is configured to perform matching according to a matching condition, an index item, or a keyword, and combine successfully-matched contacts. The updating unit 903 is configured to: when the first address book or the second address book changes, update the first address book or the second address book.

In addition, another embodiment of the present invention provides a computer storage medium for storing one or more programs. The one or more programs include an instruction, and the instruction is used to perform the following operations: associating a first address book of a first application program with a second address book of a second application program; when a content forwarding instruction is received, invoking and displaying the second address book, where the content forwarding instruction is used to forward selected content in the first application program to the second application program; determining a contact selected by a user; and forwarding the selected content to the determined contact. A specific method is the same as the method for forwarding content between different application programs.

A person of ordinary skill in the art may understand that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It should be understood that, the term "and/or" used in this specification indicates and includes any or all possible combinations of one or more items in associated listed items. It should be further understood that the term "include" and/or "include" used in this specification specifies presence of features, integers, steps, operations, elements, and/or components, with presence or addition of one or more other features, integers, steps, operations, elements, components, and/or their combinations not excluded.

It should be further understood that although the terms such as "first" and "second" may be used to describe various elements in this specification, the elements should not be limited by the terms. The terms are merely used to distinguish one element from another element. For example, the first application program may be named a second application program, and similarly, the second application program may be named a first application program without departing from the scope of the present invention.

The terms used in the description of the present invention in this specification are merely for the purpose of describing specific embodiments, and are not intended to limit the present invention. The terms "one", "a" and "this" of singular forms used in this specification and the appended claims of the present invention are also intended to include plural forms, unless otherwise specified in the context clearly.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention. Functional units in the embodiments of the present invention may be integrated into one processing unit, or each of the units may exist alone physically, or two or more units are integrated into one unit.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementations of the present invention, but are not intended to limit the protection scope of the present invention. Any variation or replacement readily figured out by a person of ordinary skill in the art within the technical scope disclosed in the present invention shall fall within the protection scope of the present invention. Therefore, the protection scope of the present invention shall be subject to the protection scope of the claims.

What is claimed is:

1. A method for forwarding content between different application programs, wherein the method comprises:
    generating a third address book by associating a first address book of a first application program with a second address book of a second application program, wherein the generating comprises:
        obtaining, by the first application program, permission to read and copy the second address book by an addition of at least one line of code in a markup language file;
        in response to determining that a first value associated with a first contact comprised in the first address book is the same as a second value associated with a second contact comprised in the second address book, merging the first contact and the second contact to generate a merged contact, wherein the first value comprises at least one of a user name, a phone number, or an email address; and
        storing the merged contact in the third address book;
    receiving a selection of particular content displayed by the first application program, wherein the particular content is performed at least one of compression or encryption by the first application program to generate encapsulated content;
    in response to receiving a content forwarding instruction, invoking and displaying the third address book, wherein the content forwarding instruction is used to forward the particular content in the first application program to the second application program;
    determining selection of a contact by a user;
    performing at least one of decompression or decryption to restore the particular content from the encapsulated content; and
    forwarding the restored particular content to the second application program of the selected contact, wherein the restored particular content is available for display by the second application program of the selected contact.

2. The method according to claim 1, wherein the associating a first address book of a first application program with a second address book of a second application program comprises:
    obtaining, by the second application program, permission to read and copy the first address book.

3. The method according to claim 1, wherein the associating a first address book of a first application program with a second address book of a second application program comprises:
    combining the first address book with the second address book; and
    generating a common address book.

4. The method according to claim 3, wherein the generating a common address book comprises:
    displaying, in different presentation formats, contacts from address books of different application programs.

5. The method according to claim 1, wherein the invoking and displaying the third address book comprises:
    displaying a menu for selecting the third address book in the first application program.

6. The method according to claim 1, wherein the forwarding the particular content to the selected contact comprises:
    encapsulating the particular content, a first application program tag, sender information, and a sending time into a message; and
    sending the message to the selected contact by using a wireless network.

7. The method according to claim 1, wherein the first application program is a short message service and the second application program is an instant messaging tool.

8. An apparatus, comprising a memory, at least one processor, a radio frequency circuit, and one or more programs, wherein the one or more programs are stored in the memory and are configured to be executed by the at least one processor, the one or more programs comprise an instruction, and the instruction instructs the at least one processor to:
    generate a third address book by associating a first address book of a first application program with a second address book of a second application program, wherein the first application program and the second application program are associated with two different messaging platforms, wherein the first application program comprises at least one of short message service (SMS) or multimedia message service (MMS) and requires a subscription to a cellular plan for using the at least one of SMS or MIMS, and wherein the second application program is an instant messaging application that does not require any subscription to a cellular plan for sending or receiving messages in the second application program, wherein the generating comprises:
        obtaining, by the first application program, permission to read and copy the second address book by an addition of at least one line of code in a markup language file;
        in response to determining that a first value associated with a first contact comprised in the first address book is the same as a second value associated with a second contact comprised in the second address book, merging the first contact and the second contact to generate a merged contact, wherein the first value comprises at least one of a user name, a phone number, or an email address; and storing the merged contact in the third address book;

receive a selection of particular content displayed by the first application program, wherein the particular content is performed at least one of compression or encryption by the first application program to generate encapsulated content;

in response to receiving a content forwarding instruction, invoke and display the third address book, wherein the content forwarding instruction is used to forward the particular content in the first application program to the second application program;

determine selection of a contact by a user;

perform at least one of decompression or decryption to restore the particular content from the encapsulated content; and forward the restored particular content to the second application program of the selected contact, wherein the restored particular content is available for display by the second application program of the selected contact.

9. The apparatus according to claim 8, wherein the associating a first address book of a first application program with a second address book of a second application program comprises:

obtaining, by the second application program, permission to read and copy the first address book.

10. The apparatus according to claim 8, wherein the associating a first address book of a first application program with a second address book of a second application program comprises:

combining the first address book with the second address book; and generating a common address book.

11. The apparatus according to claim 10, wherein the generating a common address book comprises:

displaying, in different presentation formats, contacts from address books of different application programs.

12. The apparatus according to claim 8, wherein the invoking and displaying the third address book comprises:

displaying a menu for selecting the third address book in the first application program.

13. The apparatus according to claim 8, wherein the forwarding the particular content to the selected contact comprises:

encapsulating the particular content, a first application program tag, sender information, and a sending time into a message; and sending the message to the selected contact by using a wireless network.

14. The method according to claim 1, wherein the third address book is an updated second address book comprising the merged contact and at least one additional contact of the second address book, wherein the at least one additional contact does not match any contact of the first address book.

15. The apparatus according to claim 8, wherein the third address book is an updated second address book comprising the merged contact and at least one additional contact of the second address book, wherein the at least one additional contact does not match any contact of the first address book.

16. The method according to claim 1, comprising:

receiving the content forwarding instruction;

in response to receiving the content forwarding instruction, displaying a first option and a second option, wherein the first option indicates forwarding the particular content to the first application program, wherein the second option indicates forwarding the particular content to the second application program, wherein the first application program and the second application program are associated with two different messaging platforms, wherein the first application program comprises at least one of short message service (SMS) or multimedia message service (MMS) and requires a subscription to a cellular plan for using the at least one of SMS or MMS, and wherein the second application program is an instant messaging application that does not require any subscription to a cellular plan for sending or receiving messages in the second application program;

receiving a selection of the second option; and in response to receiving the selection of the second option, invoking and displaying the third address book.

* * * * *

UNITED STATES PATENT AND TRADEMARK OFFICE
CERTIFICATE OF CORRECTION

PATENT NO. : 11,438,298 B2
APPLICATION NO. : 15/769043
DATED : September 6, 2022
INVENTOR(S) : Zhidong Tao It is certified that error appears in the above-identified patent and that said Letters Patent is hereby corrected as shown below:

In the Claims

In Column 20, In Line 53, In Claim 8, delete "MIMS," and insert -- MMS, --.

Signed and Sealed this
Twenty-fifth Day of April, 2023

Katherine Kelly Vidal
*Director of the United States Patent and Trademark Office*